United States Patent [19]
Dosch

[11] 3,823,504
[45] July 16, 1974

[54] HUMANE ANIMAL TRAP

[76] Inventor: Mathew L. Dosch, Box 251, Ipswich, S. Dak. 57451

[22] Filed: Jan. 19, 1973

[21] Appl. No.: 324,965

[52] U.S. Cl. ................................................. 43/61
[51] Int. Cl. ........................................... A01m 23/18
[58] Field of Search ................................. 43/61, 58

[56] References Cited
UNITED STATES PATENTS

| | | | |
|---|---|---|---|
| 1,283,232 | 10/1918 | Lewis | 43/61 |
| 1,858,096 | 5/1932 | Lementy | 43/58 |
| 2,518,819 | 8/1950 | Roessler, Jr. | 43/61 |
| 2,793,464 | 5/1957 | Bird | 43/61 |

Primary Examiner—Antonio F. Guida
Assistant Examiner—Daniel J. Leach
Attorney, Agent, or Firm—Williamson, Bains & Moore

[57] ABSTRACT

A humane animal trap comprises an elongate generally rectangular housing formed of impervious material and having a spring urged trap door closing the front end thereof. A releaseable latch retains the trap door in an open or set position and is released by operation of a cam trigger. The trigger is connected to and is operated by a treadle plate. The housing is provided with a valve which permits a user to introduce a predetermined amount of an anesthetizing fluid, such as chloroform or the like, into the housing for anesthetizing the trapped animal.

8 Claims, 4 Drawing Figures

PATENTED JUL 16 1974 3,823,504
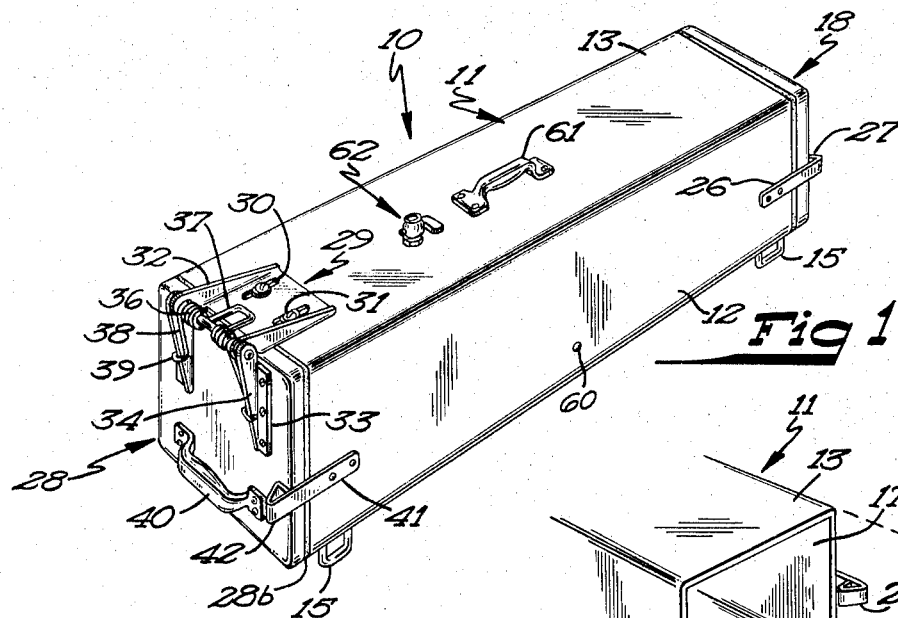
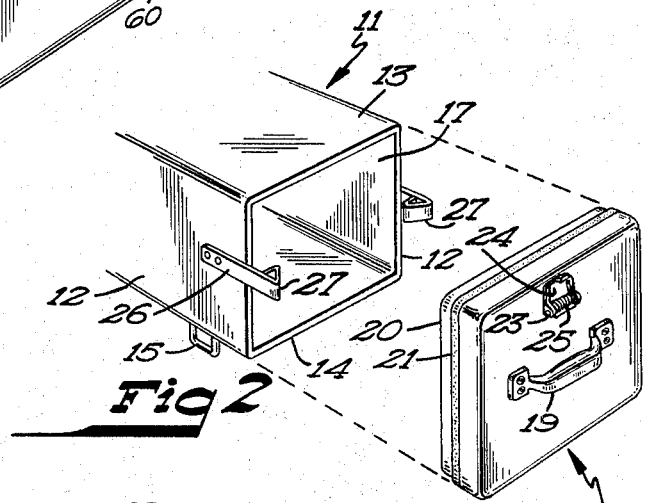
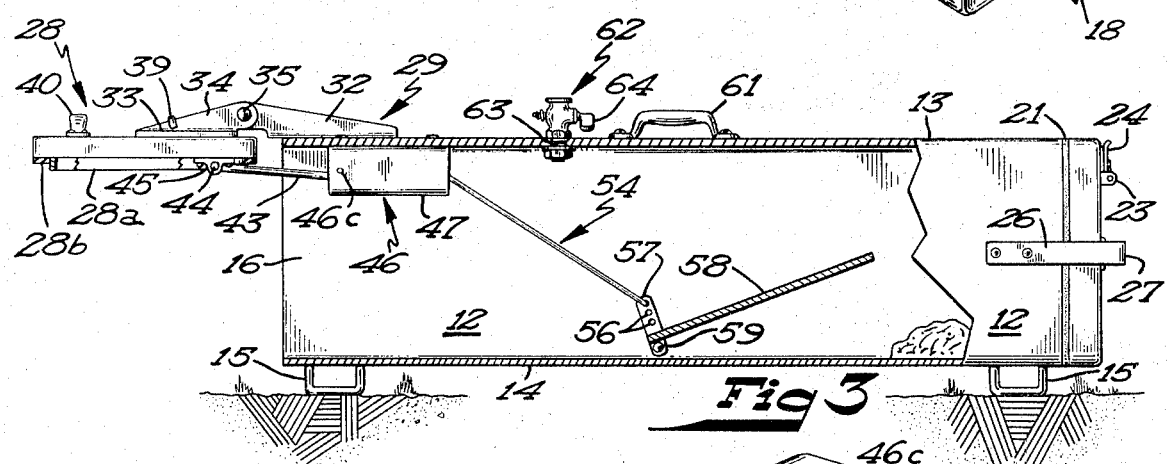
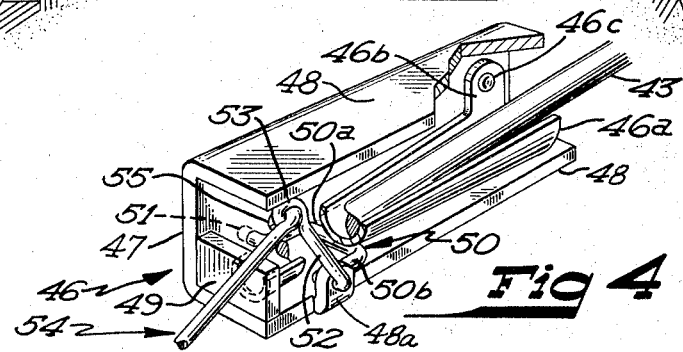

HUMANE ANIMAL TRAP

BACKGROUND OF THE INVENTION

This invention relates to animal traps and more specifically to traps which permit animals to be trapped alive, and then allows a trapper to humanely asphyxiate the trapped animal or to anesthetize the animal for handling.

There are commercially available traps which are adapted to trap the animal alive, but none of these traps permit the trapper to dispose of an odor-producing animal, such as a trapped skunk or similar animal, without exciting the animal which results in the occurrence of obnoxious odors. The commercially available traps which allow the animal to be trapped alive are of open wire construction and odor-producing animals such as skunks are difficult to dispose of without the occurrence of the noxious odors.

It is an object of this invention to provide a humane animal trap which is not only highly effective in trapping animals such as skunks, weasels and the like but which permits handling of the trapped animal, such as a skunk, in a humane manner so that the animal will not produce its normally obnoxious odor.

The trap is comprised of an air impervious chamber which is sealed with respect to the exterior when the trap is in the closed condition, and the housing is provided with a valve which permits the user to introduce a predetermined amount of an anesthetizing liquid into the housing for anesthetizing the trapped animal. With this arrangement, a trapper may introduce a lethal amount of chloroform into the trap which results in the humane killing of the animal, or alternatively the trapper may introduce a non-lethal amount so that the animal is merely anesthetized. Thus the trapper may easily and safely handle the anesthetized animal to transfer the animal to a cage or alternatively to release the animal.

The trap is also provided with a spring urged trap door which is retained in an open or set position by a novel latch mechanism and which is released by a novel trigger mechanism controlled by the treadle plate. The present trap is not only effective in trapping and disposing of odor producing animals such as skunks, or members of the weasel family, but actually simulates a den or natural habitat for such animals so that the animal will remain unexcited even when the trap is sprung.

These and other objects and advantages of this invention will more fully appear from the following description made in connection with the accompanying drawings wherein like reference characters refer to the same or similar parts throughout the several views, and in which:

FIG. 1 is a perspective view of the novel animal trap illustrated in the closed condition, FIG. 2 is a fragmentary exploded perspective view of the rear portion of the trap, illustrating details of construction thereof, FIG. 3 is a side elevation of the trap in the open or set condition, with certain parts thereof broken away for clarity and FIG. 4 is an enlarged perspective view of the latch and the trigger mechanisms, illustrating details for construction thereof.

DESCRIPTION OF THE PREFERRED EMBODIMENT

Referring now to the drawings and more specifically to FIG. 1, it will be seen that one embodiment of the novel humane animal trap, designated generally by the reference numeral 10, is there shown. The trap 10 is comprised of a generally rectangular shaped housing 11, preferably formed of a rigid air impervious metallic material and including substantially parallel side walls 12, a top wall 13, and a bottom wall 14. A pair of generally rectangular shaped elongate leg elements 15, are affixed to the lower surface of the bottom wall 14, and extend longitudinally thereof adjacent the respective front and rear ends of the housing. The housing 11, has an open front end 16 and an open rear end 17.

The open rear end 17 of the housing is closed by rear closure member 18, which, as shown, is of generally rectangular-shaped configuration and which is formed of a suitable metallic material. The rear closure member is provided with a handle 19, which is secured to the rear surface thereof by suitable bolts of the like. The closure member is also provided with a generally rectangular shaped continuous annular flange 20 of reduced dimensions which projects forwardly from the front surface thereof. It will be noted that the flange 20 is spaced inwardly from the periphery of the closure member, and is shaped and sized to project forwardly of the open rear end of the housing.

A continuous generally rectangular shaped annular compressible sealing element 21 is affixed to the side edges of the rear closure member outwardly of the flange 20. This sealing element is adapted to engage the rear edges of the side walls, top wall, and bottom wall of the housing to form an air tight seal thereat. It will be seen that the flange 20 serves to prevent a trapped animal from having access to this sealing element.

The rear closure member 18 is also provided with an inspection or vent opening which is closed by a small door or plate 24 pivotally mounted on brackets or ears 23 which are affixed to the rear surface of the closure member. It will be seen that the door is vertically swingable about a transverse axis defined by the hinge pin and is normally urged to the closed condition by a spring 25. It is pointed out that the vent door 24 is provided with an annular sealing element which forms a seal with 48. rear closure member when the door is in the closed condition. The rear closure member 18 is releasably retained in its closed condition by a pair of resilient latch arms 26, each being 23 to one of the side walls of the housing by suitable bolts or the like. The latch arms 26 project rearwardly and each is bent to form a generally triangular shaped inwardly projecting latch element 27 which releasably engages the exterior surface of the door to releasably hold the same in a closed condition.

The open front end of the housing is closed by the trap door 28 which is also a generally rectangular configuration and which is mounted for swinging movement relative to the housing between closed and open conditions. The means for swingably mounting the trap door on the housing comprises a substantially flat bracket 29 which is provided with a pair of spaced apart elongate slots 30 therein through which project bolts 31 that are accommodated in suitable openings in the top wall 13 of the housing. The slots 30 permit fore and aft adjustment of the bracket 29 relative to the top wall of the housing. The bracket 29 is provided with a pair of bracket arms 32 which are integrally formed therewith and which project upwardly and forwardly therefrom. The outer ends of the bracket arms 32 project forwardly of the housing and each has an aperture therein.

The trap door 28 is also provided with a pair of angle brackets 33 which are affixed to the outer surface of the door by suitable bolts. Each bracket 33 has a bracket arm 34 integrally formed therewith and these bracket arms 34 extend upwardly and outwardly from the door when the door is in the closed position. Each of the bracket arms 34 also has an aperture in its outer end for accommodating a hinge pin 35 which also projects through the openings or apertures in the bracket arms 32. With this arrangement, the trap door 28 is vertically swingable between an open position, as illustrated in FIG. 2, and a closed position, as illustrated in FIG. 1.

Means are provided for normally urging the trap door towards the closed position, and this means includes a spring 36 which is coiled about the hinge pin 35. The spring 36 includes a U-shaped portion 37 which bears against the bracket 29, and a pair of spring arms 38 that project therefrom and are disposed closely adjacent the bracket arms 34 of brackets 33. The spring arms 38 each include a terminal U-shaped portion 39 which is positioned in engaging relation with one of the bracket arms 34. With this arrangement, it will be seen that when the door 28 is swung to the open position, it is against the bias of the spring 36.

The trap door 28 is also provided with a U-shaped handle 40 which is secured to the exterior surface of the trap door by suitable bolts. The inner surface of the trap door 28 is provided with a continuous annular flange 28a which is of generally rectangular configuration and which is shaped and sized to fit within the open front end of the housing 11. It will be noted that the flange 28a is spaced inwardly from the peripheral edge of the trap door, and it will be further noted that the door is provided with an annular compressable sealing element 28b secured to the inner surface thereof and located exteriorly of the flange 28a. An elongate resilient latch arm 41 is secured to one of the side walls of the housing by suitable bolts and the latch arm projects forwardly therefrom. The forward end of the latch arm is bent to define a door engaging element 42 which is adapted to engage the exterior of the trap door when the latter is in the closed position to releasably hold trap door in the closed position.

The trap door 28 is also provided with a suitable latch mechanism for releasably holding the door in an open condition and this latch mechanism includes an elongate substantially straight latch rod or element 43 which has one end thereof bent as at 44. This bent end of the latch rod 43 is pivotally mounted on a bracket 45, which is secured to the inner surface of the door. An elongate generally U-shaped latch retaining member 46 is secured to the under surface of the top wall and against a side wall of the housing and is spaced inwardly from the open front end of the housing. The U-shaped retaining member 46 includes a wall portion 47 having spaced apart walls 48 integrally formed with wall portion 47 and projecting therefrom. The latch retaining member 46 also has a relatively shallow end wall 49 which serves as a retaining element for the latch rod 43. In this respect, it will be noted that when trap door 29 is raised to the open position, the latch rod 43 may be positioned against the abutment surface defined by the end wall 49 of the latch retaining member 46, thus holding the door in the open or set condition.

Means are also provided for triggering or releasing the latch rod 43 from its latched position and this means includes a generally U-shaped trigger cam 50 comprised of a bight portion 50a having a pair of legs 50b integrally formed therewith and extending therefrom. The legs 50b have out-turned ends 51, and these ends 51 project through openings in the wall 47 of the latch retaining member 46 and through an opening in a tab 48a affixed to and projecting upwardly from one of the walls 48. Thus the trigger cam is pivotally mounted on the latch retaining member 46 for swinging movement between raised and lowered positions.

An elongate channel-shaped lift structure 46a is positioned within the latch retaining member 46 and has an arm 46b integral therewith and projecting upwardly therefrom adjacent the front end thereof. The arm is pivotally connected to the side wall of the latch retaining member by a pivot 46c. It will be seen that when the trigger cam 50 is pivoted from a lowered position to a raised position, the lift structure 46a will also be raised to thereby raise the end portion of the rod 43 and release the same from engaged relation with said end wall 49.

One of the ends 51 of the trigger cam has an arm 52 integrally formed therewith and projecting angularly therefrom as best seen in FIG. 4. The free end of the arm 52 is bent to form an eye or hook 53 through which projects the bent end 55 of an elongate actuating link 54. The arm 52 is actually positioned interiorly of the latch retaining member 46 to prevent damage thereto by a trapped animal.

The other end of the actuating link 54 is also bent and projects through one of a plurality of apertures 56 formed in an arm 57. It will be noted that arm 57 is rigidly affixed to the front end portion of a generally rectangular substantially flat treadle plate 58 which is positioned interiorly of the housing adjacent the rear portion thereof. The front end portion of the treadle plate 58 also has downturned ears 59 which are pivotally connected to a pivot pin 60 which projects through the side walls of the housing 11.

The upper wall of the housing 11 is also provided with a generally U-shaped handle 61 which is secured thereto by suitable bolts of the like and which is longitudinally oriented and positioned closely adjacent the center portion of the top wall. The handle 61 facilitates carrying of the trap. A valve 62 having a threaded portion 63 threadedly engages in a threaded aperture on the top wall 13 and this valve permits intercommunication of the interior of the trap with the exterior when the trap is in the closed position. The valve is provided with a spring urged actuator handle 64 which is movable between open and closed position. It will be seen that when the valve is shifted to an open condition, an anesthetizing liquid such as chloroform may readily be introduced to the interior of the trap to permit anesthetizing of the trapped animal.

In use, the trap will be provided with a suitable bait, and the bait may be properly placed by removing the rear closure member 18 to gain access to the rear portion of the trap. The rear closure member will then be replaced, and the trap door 28 will be latched in the open position as best seen in FIG. 3. It will be noted that when the door 28 is latched in the open position, the door projects forwardly of the housing. The valve 62 will be closed and the treadle plate 58 will be inclined upwardly and rearwardly when in the set position.

By selectively adjusting the angle of the treadle plate 58 and rod 43, the treadle plate and trigger mechanism may be selectively adjusted for animals of different weights. Thus when trapping a lightweight animal, the treadle plate will be lowered (only slightly inclined in the set position) and the latch rod 43 will be positioned with its free end against the end wall 49 adjacent the upper edge thereof. However, when trapping a heavier animal the treadle plate will be raised (substantially inclined in the set position) and the latch rod 43 will be positioned against the end wall 49 adjacent the lower portion thereof.

When the trap is in the set position, the latch rod 43 will be positioned upon the lift structure 46a, and the end of the latch rod 43 will engage the end wall 49 of the latch retaining member 46. The trigger cam 50 will be in the lower position. When an animal steps or crawls upon the treadle plate 58, the weight of the animal will urge the treadle plate downwardly and rearwardly, thereby causing rearward longitudinal movement of the actuating link 54. This rearward longitudinal movement of the actuating link 54 raises the trigger cam 50 which in turn raises the lift structure 46a and latch rod 43 to thereby release the latter. When the latch rod 43 is released, the trap door 28 will then be urged downwardly to the closed position by a spring 36, thereby trapping the animal within the housing.

When the trap is sprung by an animal, the trap door 28 will be swung with substantial force to the closed position and will be releasably locked by camming past the latch arm 41. However, because of the construction of housing, substantially no light can penetrate the interior of the housing. In this respect, it is preferred that the trap be painted a dark color, preferably black, especially the interior of the housing. Since the housing is of elongate construction, it does, in fact, simulate a den or small cavern which often constitutes the natural habitat of such animals as weasels, minks, skunks, badgers, raccoons and the like.

After the animal has been trapped, a trapper may observe the trapped animal through the inspection door. Then if the animal is to be killed, a lethal amount of chloroform may be introduced into the housing through the valve 62, and the valve will then be closed. It has been found that animals such as weasels, minks, skunks, badgers, raccoons, feral cats and domestic cats and the like, will die in approximately 30 minutes after the lethal amount of the chloroform has been introduced into the housing. The death of the animal is peaceful and humane and the pelt of the animal will in no way be damaged. When it is desirable to merely anesthetize the animal for handling, a smaller amount of chloroform will be introduced into the housing, and it has been found that a trapped animal will become anesthetized in approximately 12 minutes, and will remain in an anesthetized condition for approximately 10 minutes. Thus it will be seen that the animal may be transferred to a cage while in the anesthetized condition or may be released safely by the trapper.

The trap has been found to be especially useful in trapping and disposing of skunks, since the trapped animal may be humanely put to death or anesthetized for handling. Since the housing so simulates the natural habitat of the skunks, civet cats and other odor-producing animals, such as members of the weasel family, the trapped animals will remain in an unexcited condition even when the trap is sprung. It also becomes apparent that the trapper may approach the trap without exciting the trapped animal since the interior of the trap is completely shielded from the exterior.

Thus it will be seen that I have provided a novel humane trap which is highly effective in trapping and disposing of odor-producing animals such as skunks, civet cats, members of the weasel family and the like. It will further be noted that the trap also permits a user to very effectively anesthetize a trapped animal thereby allowing the anesthetized animal to be transferred to a cage or released while in the anesthetized condition. The trap is also effective in trapping and controlling stray domestic cats.

Thus it will be seen that I have provided a novel humane trap which functions in a more efficient manner than any heretofore known comparable trap.

I claim:

1. An animal trap comprising an elongate generally rectangular housing formed of air impervious material and having an open front end, said housing including substantially parallel side walls an upper wall and a top wall, a generally rectangular air impervious trap door, means hingedly connecting the trap door on said housing for vertical swinging movement of the door between opened and closed positions about a horizontal transverse axis located adjacent the upper portion of the housing, said trap door when in the closed position engaging the front end of said housing in sealing relation and when in the open position being disposed forwardly of the front end of said housing, resilient means engaging said housing and said door to normally urge said door to the closed position, an elongate latch element having one end thereof pivotally connected to the inner surface of said door, a latch retaining member mounted in said housing and having a latch engaging element engaged by the other end of said latch element to releasably hold the door in an open position, a trigger cam shiftably mounted on said latch retaining member and underlying and engaging said latch element when the latch element is disposed in engaging relation with said latch engaging surface, a treadle plate pivotally mounted within said housing for pivotal movement about a horizontal transverse axis between release and set positions, an elongate actuating link having one end thereof pivotally connected with said treadle plate and having its other end pivotally connected with said trigger cam, for shifting the trigger cam to release said latch element from engaged relation with the engaging element when the treadle plate is depressed whereby said trap door will swing to the closed position, a valve on said housing intercommunicating the interior of the housing with the exterior, and an acutating handle for opening and closing said valve to permit introduction into the housing of an anesthetizing fluid such as chloroform.

2. The trap as defined in claim 1 wherein said treadle plate is of generally rectangular configuration and is pivotally connected adjacent its front end to the sidewalls of said housing intermediate the front and the rear ends of the latter.

3. The trap as defined in claim 1, wherein said resilient means comprises a spring positioned externally of the door and exteriorly of the housing.

4. The trap as defined in claim 1 wherein said housing has an open rear end, a generally rectangular air impervious closure member engaging said rear end of the housing for closing the same in sealing relation and being removable therefrom.

5. The trap as defined in claim 4 wherein said trap door and said closure member each has a continuous flange on the front surface thereof which projects interiorly of the housing when the trap door and the closure member are in closing relation with said housing, said trap door and said closure member each having an annular sealing element on the side edges thereof and located exteriorly of the associated continuous flange for sealingly engaging the housing.

6. The trap door as defined in claim 1 wherein said latch retaining member is of elongate U-shaped construction and is secured to said top wall, said latch engaging element comprising a transverse wall on said latch retaining member.

7. The trap as defined in claim 6 wherein said trigger cam is of U-shaped construction.

8. An animal trap comprising
an elongate housing formed of air impervious material and having an open front end, said housing including elongate opposed impervious wall portions, a generally flat air impervious trap door, means hingedly connecting the trap door on said housing for vertical swinging movement of the door between opened and closed positions about a horizontal transverse axis located adjacent the upper portion of the housing, said trap door when in the closed position engaging the front end of said housing in sealing relation and when in the open position being disposed forwardly of the front end of said housing resilient means engaging said housing and said door to normally urge said door to the closed position, an elongate latch element having one end thereof pivotally connected to the inner surface of said door, a latch retaining member mounted in said housing and having a latch engaging element engaged by the other end of said latch element to releasably hold the door in an open position, a trigger cam shiftably mounted on said latch retaining member and underlying and engaging said latch element when the latch element is disposed in engaging relation with said latch engaging surface, a treadle plate pivotally mounted within said housing for pivotal movement about a horizontal transverse axis between release and set positions, an elongate actuating link having one end thereof pivotally connected with said treadle plate and having its other end pivotally connected with said trigger cam, for shifting the trigger cam to release said latch element from engaged relation with the engaging element when the treadle plate is depressed whereby said trap door will swing to the closed position, a valve on said housing intercommunicating the interior of the housing with the exterior and an actuating handle for opening and closing said valve to permit introduction into the housing of an anesthetizing fluid such as chloroform.

* * * * *